Patented Dec. 8, 1942

2,304,102

UNITED STATES PATENT OFFICE 2,304,102

PROTEIN COMPOSITION

Percy L. Julian, Maywood, Andrew G. Engstrom, Chicago, and Elmer B. Oberg, Evanston, Ill., assignors to The Glidden Company, Cleveland, Ohio, a corporation of Ohio No Drawing. Application April 19, 1939, Serial No. 268,692

12 Claims. (Cl. 106—154)

The present invention relates to a stable protein dispersion, and more particularly relates to a protein composition particularly suitable for making paints and paint clears.

Protein solutions are ordinarily prepared by dissolving protein in an aqueous alkaline solution. Such solutions have a relatively high pH value, and for many purposes solutions of low pH are desirable. If strong mineral acids are added to lower the pH of alkaline solutions some improvement may be obtained without undue increase in the viscosity, but such solutions are not stable. Boric acid may be used but it forms a buffer with the alkali, and solutions below a pH of about 8 using boric acid alone are not ordinarily possible when treating the highly alkaline solutions mentioned above.

It has been found, however, that if glycerine or other water soluble polyhydric alcohol such as glycols, etc. are added in addition to boric acid, that comparatively stable, non-putrifying emulsions can be prepared or relatively low pH. In some instances solutions having a pH as low as 5 may be prepared from an isolated soy bean protein which was precipitated from an alkaline solution by means of acid at pH 4.6 to 4.8. This is a rather surprising result because of the closeness of the pH values and the fact that the isoelectric point of the protein is not a sharp one. Another unexpected result is the fact that the pH is lowered upon the addition of the glycerine or other water soluble polyhydric alcohol.

According to a preferred example a 25% solution of an isolated soy bean protein is prepared, employing 3% sodium hyroxide by weight of the protein. Heat is preferably employed in preparing the solution in a manner conventional in the art. Boric acid in amount of 10% by weight of the protein is then added, and after solution was complete 10% of glycerine by weight of protein was added. The final pH was 6.6. The dispersion was stable and after six months' standing showed no signs of breaking.

Casein was substituted in the above example in an equal amount by weight, the final dispersion having a pH of 6.4. This casein dispersion was stable but did not exhibit the remarkable stability of the soy bean protein dispersion. Ethylene glycol substituted for glycerine in equal amount, gives a final pH of 6.8 but the solution is not as stable as when glycerine is used, although considerable stability results despite the lowered pH. Omission of the alcohol altogether results in a fairly stable solution but the pH value is relatively high. Omission of the boric acid results in rapid putrefaction and precipitation.

Various other alkaline solvents than sodium hydroxide may be used. Also it is preferable not to use alkali much in excess of that required to produce good solution of the protein.

The compositions contemplated by the present invention, particularly those employing glycerine are excellently suited for use in paint or paint clears, etc. where storage of the composition is desirable. A paint was prepared from the glycerine stabilized protein composition described above, in which paint the ingredients by weight were as follows:

| | Parts |
|---|---|
| Protein solution | 3438 |
| Titanated lithopone | 3120 |
| Clay | 1680 |
| Mica | 300 |
| Linseed oil (or other drying oil) | 120 |
| Kerosene (or other thinner) | 300 |
| Pine oil | 120 |
| Alcohol | 120 |

The ingredients were first mixed and then ground on a roller mill in a conventional manner to produce a paint of good consistency.

While certain preferred forms and embodiments of the invention have been given it will be apparent to those skilled in the art that various modifications and changes may be made therein within the scope of the appended claims without departing from the spirit of the invention.

Having described the invention what is desired to secure by Letters Patent of the United States is:

1. A stable protein solution comprising a soybean protein, an alkaline solvent for said protein, water, boric acid, and a water soluble polyhydric alcohol, said composition having a pH between about 8 and 5, said composition having a lower pH value than it would have if the water soluble alcohol were omitted.

2. A stable protein solution comprising an isolated soybean protein, an alkaline solvent for said protein, water, boric acid and a water soluble polyhydric alcohol, said composition having a pH between about 8 and 5, said composition having a lower pH value than it would have if the water soluble alcohol were omitted.

3. A stable protein solution comprising a soy bean protein, an alkaline solvent for said protein, water, boric acid and glycerine, said composition having a lower pH value than it would have if the glycerine were omitted, the amount of glycerine being such that the pH value is lower than if it were not present.

4. A stable protein solution comprising an isolated soy bean protein, an alkaline solvent for said protein, water, boric acid and glycerine, said composition having a lower pH value than it would have if the glycerine were omitted, the amount of glycerine being such that the pH value is lower than if it were not present.

5. A stable protein solution comprising an isolated soy bean protein, sodium hydroxide, water, boric acid and glycerine, said composition having a lower pH value than it would have if the glycerine were omitted, the amount of glycerine being such that the pH value is lower than if it were not present.

6. A coating composition characterized by its stability over relatively long periods of time comprising pigment and an aqueous protein solution containing sufficient alkali to dissolve the protein and to produce a relatively high pH value and containing sufficient boric acid and glycerine to produce a relatively low pH value of the solution, the amount of glycerine being such that the pH value is lower than if it were not present.

7. The composition of claim 6 in which the protein is soybean protein.

8. The composition of claim 6 in which the protein is an isolated soybean protein, the amount of glycerine being such that the pH value is lower than if it were not present.

9. A coating composition characterized by its stability over relatively long periods of time, comprising drying oil, thinner pigment and an aqueous solution of soybean protein containing sufficient alkali to dissolve the protein and to produce a relatively high pH value, and containing sufficient boric acid and glycerine to produce a relatively low pH value of the solution, the amount of glycerine being such that the pH value is lower than if it were not present.

10. The method of lowering the pH value of an aqueous alkali soya bean protein solution which comprises adding boric acid and glycerine to said solution, the amount of glycerine being sufficient to produce a lower pH value than if it were omitted.

11. The method of lowering the pH value of an aqueous alkali solution of an isolated soya bean protein which comprises adding boric acid and glycerine to said solution, the amount of glycerine being sufficient to produce a lower pH value than if it were omitted.

12. The method of lowering the pH value of an aqueous sodium hydroxide solution of an isolated soya bean protein which comprises adding boric acid and glycerine to said solution, the amount of glycerine being sufficient to produce a lower pH value than if it were omitted.

PERCY L. JULIAN.
ANDREW G. ENGSTROM.
ELMER B. OBERG.